ns Patent Office 3,088,098
Patented Apr. 30, 1963

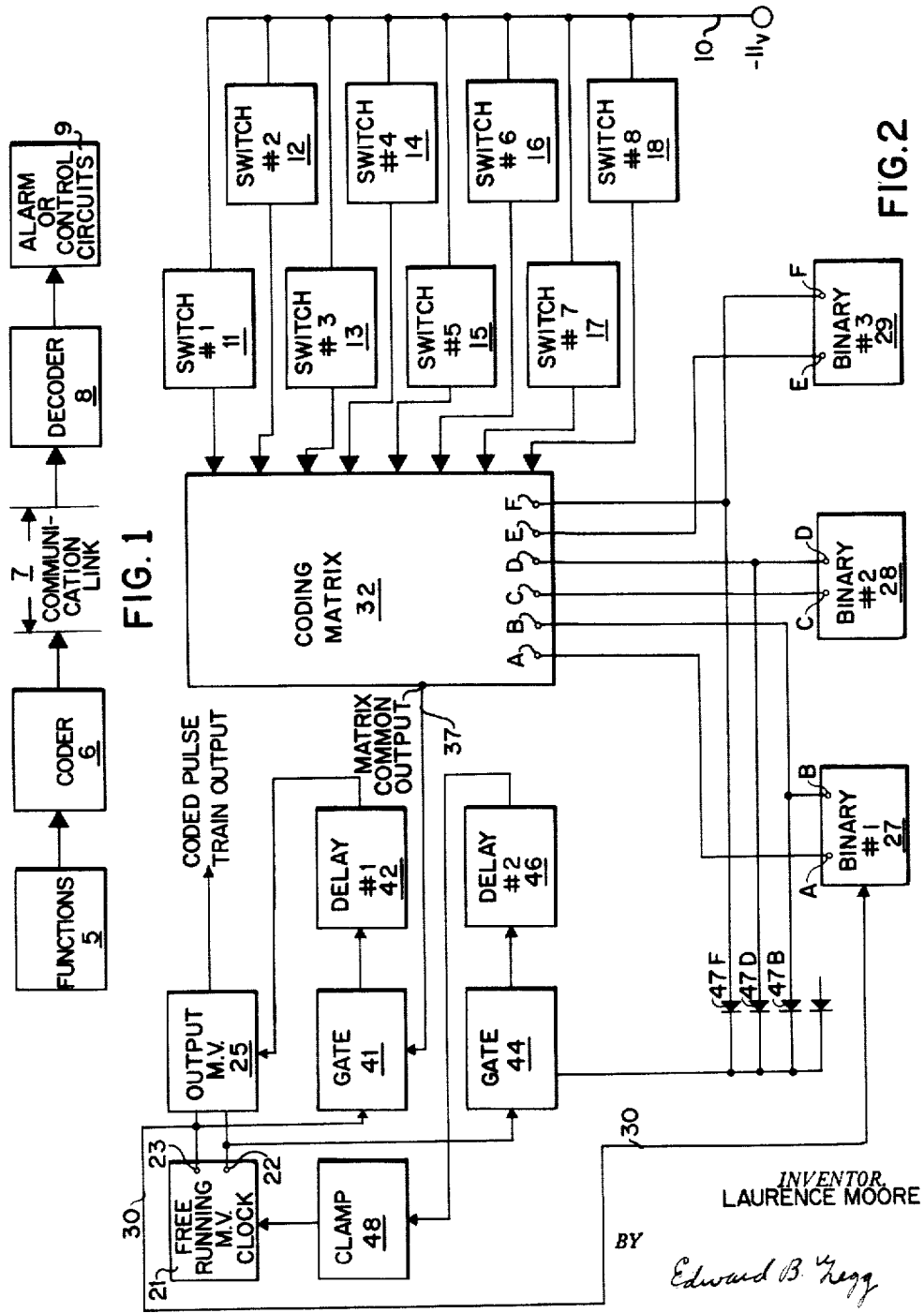

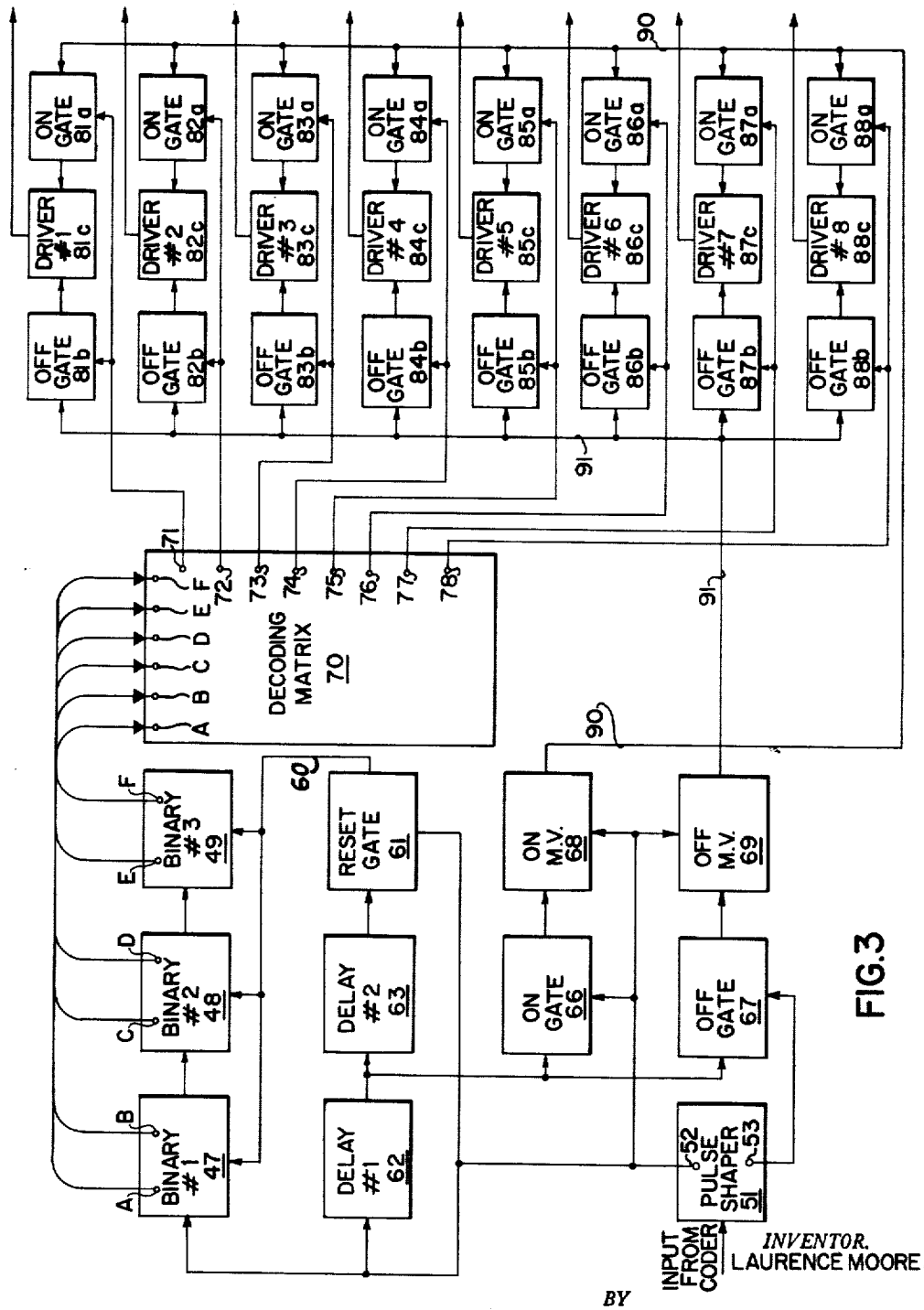

3,088,098
DIGITAL TELEMETERING SYSTEM
Laurence Moore, Menlo Park, Calif., assignor to Moore Associates, Inc., Redwood City, Calif., a corporation of California
Filed Dec. 30, 1959, Ser. No. 862,955
12 Claims. (Cl. 340—150)

This invention relates in general to telemetering and monitoring equipment, and relates more particularly to such equipment for continuously and rapidly monitoring a series of functions which can be binarily represented, and providing an indication of the condition of these functions at another location.

In accordance with the present invention, there is provided a coding station which samples the functions to be monitored or controlled and emits a pulse train whose pulses represent the condition of the functions under control. Each of the pulses within this train represents one of the functions and a characteristic of each pulse is modified in response to a variation in the corresponding function. In the preferred embodiment, the width or duration of each pulse is subject to modification in response to a change in the corresponding function, so that the width of each pulse in the resultant pulse train is a measure of the status of the corresponding function.

In accordance with one feature of the present invention, there is provided a clock which serves both as the basic timing source for the system and as a source of pulses which form the coded pulse train. This dual function is achieved by utilizing a clock which generates unsymmetrical pulses within a given period. The pulses recur at a regular frequency, so that this frequency can be utilized as a master timing source for the system, and the lack of symmetry of the pulses within a period provides the basis for a code which can be used to binarily indicate the condition of a function. That is, each pulse in a cycle corresponds to a different function, and one unsymmetrical condition of a pulse represents one condition of the corresponding function, while the opposite condition of this pulse represents the other condition of the function. By thus utilizing a single clock as both a timing source and a source of the code pulses, the present invention eliminates the need for, and expense of, separate elements to perform these two functions.

The pulse train generated at the coding station is transmitted by suitable means to a decoding station where it is continuously analyzed to detect the presence and position of any pulse or pulses whose duration indicates a modification of one of the functions. Upon detection of such modification at the decoding end, suitable apparatus such as an alarm, warning light or other means is actuated and remains actuated until the condition of the modified function has returned or been returned to its desired state.

In accordance with the present invention, the pulse train generated at the coding station is repeated at a high frequency so that there is no appreciable interval between successive scannings or monitorings of a given function, even where the number of such functions to be monitored is high. In addition to the information-containing pulses in the train, the train also contains a reference period which is utilized to synchronize the coding equipment with the decoding equipment once each cycle of the pulse train so that the proper pulse-function relationship can be accurately determined.

Objects and advantages of the present invention will be readily apparent from the following description when read in connection with the accompanying drawings, in which:

FIGURE 1 is a schematic diagram of the elements of the complete system of the present invention;

FIGURE 2 is a schematic block diagram of the equipment forming the coding portion of the novel equipment of this invention;

FIGURE 3 is a schematic block diagram of the equipment forming the decoding portion of the system;

Figure 4:
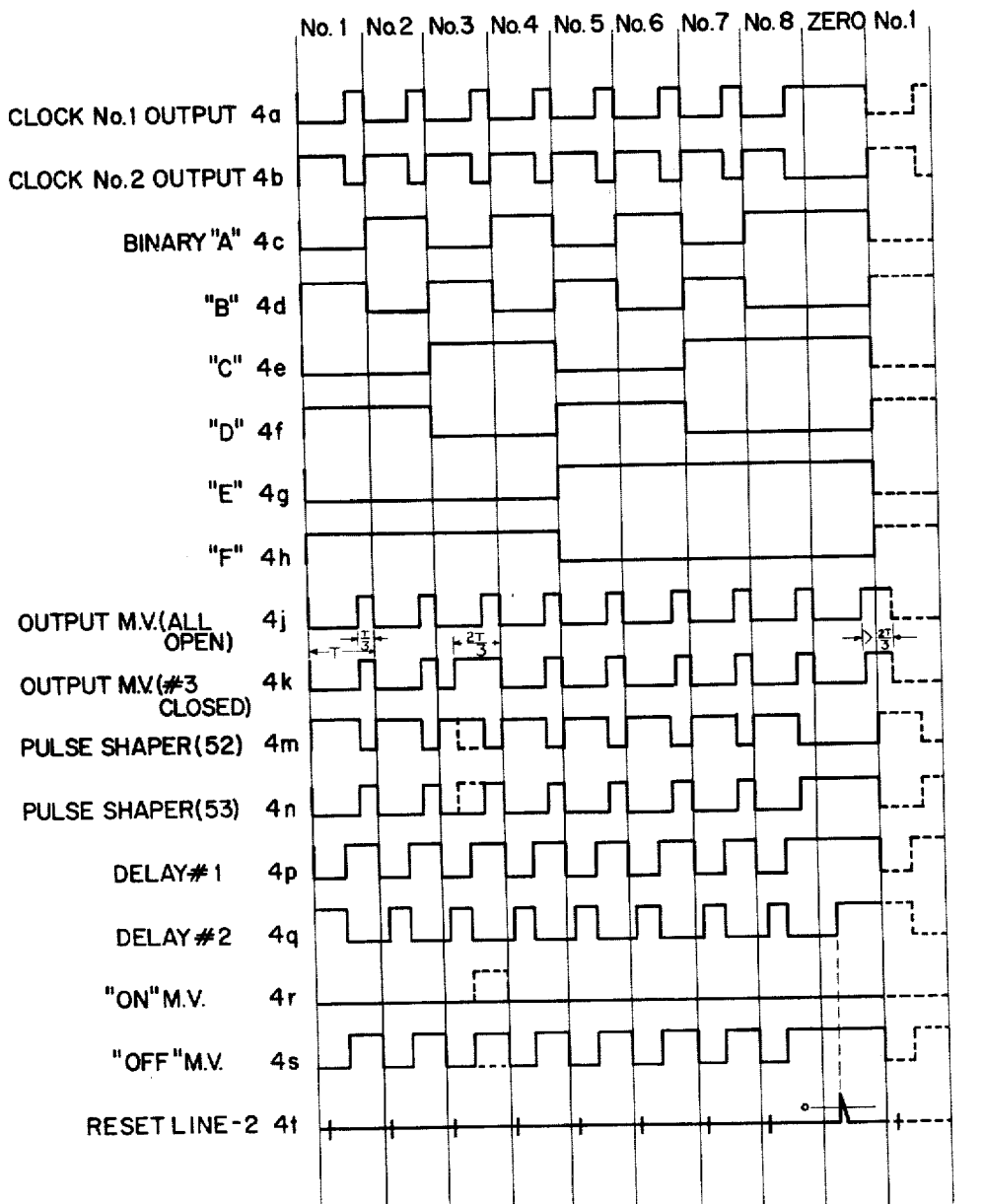
FIGURE 4 is a series of timing diagrams illustrating the wave forms at different points in the circuits of FIGURES 2 and 3.

Referring to FIGURE 1, the system of the present invention is shown schematically for monitoring a plurality of functions indicated at 5. These functions are monitored by the coder 6 and a pulse train is emitted from coder 6 which provides an indication of the condition of each of the functions. This pulse train is transmitted over a suitable communication link 7, such as telephone lines, carrier equipment plus telephone lines, or VHF or microwave radio. The transmitted pulse train is received at a decoder 8 where it is decoded and supplied to utilization or alarm circuitry 9 to provide an indication of, or an operation in response to, the condition of the monitored functions.

Referring to FIGURE 2, there is shown one embodiment of the coder portion of the present invention in connection with the monitoring of the condition of a plurality of functions represented by switches 11, 12, 13, 14, 15, 16, 17 and 18. Switches 11—18 diagrammatically represent any functions which are to be monitored or controlled by the present invention and which can be represented in binary form. A source of negative potential, represented by conductor 10, may be connected in common to one terminal of each of switches 11—18. In practice, the functions represented by these switches may be of any suitable type, such as the position of a valve or the like. For the purposes of the present embodiment, let it be assumed that the functions correspond to a condition which is considered normal when the associated switch is open and which is considered abnormal when the switch is closed.

To continuously monitor the condition of the switches there is provided a clock in the form of a free running unsymmetrical multivibrator 21 which has a pair of output terminals represented by conductors 22 and 23.

Clock 21 provides the basic timing for the system and also provides the pulse train which is coded to carry the binary information. The cycle of clock 21 is divided into eight periods corresponding to the eight functions. The output waveforms from output conductors 22, 23 are shown by the graphs of 4a and 4b. The output from terminal 22 has a negative portion which occupies two-thirds of a period and then has a positive portion occupying the remaining one-third of the period, while the output from terminal 23 is the complement of that from terminal 22, so that it begins with a positive going portion occupying two-thirds of the cycle and ends with a negative portion for the remaining one-third. In the timing diagram of FIGURE 4, the period referred to is the period in which one of the functions is sampled. Thus, as shown across the top of the timing diagrams of FIGURE 4, for the eight function system which is assumed here, there are eight such periods during a cycle of clock 21, plus a "zero" or synchronizing period at the end of the cycle.

The outputs from terminals 22, 23 are supplied to the inputs of an output multivibrator 25 which is preferably a bistable multivibrator which follows the clock 21. The output of multivibrator 25 comprises the pulse train from the coder which is transmitted over communication link 7 to the decoder.

The positive going output signal from output terminal 23 of clock 21 is also supplied through a conductor 30 to the input of a group of devices 27, 28 and 29 labelled "binary #1," "binary #2" and "binary #3," respectively. Devices 27, 28 and 29 may be of any suitable type, such as bistable multivibrators, which divide the initial pulses from clock 23 by two, four and eight, respectively, as is well understood in the art. Each of devices 27, 28 and 29 has two outputs, as illustrated in the timing diagrams 4c—4h. The two outputs A, B from device 27 are the complements of each other and have a period equal to twice the period of clock 21, as shown in curves 4c and 4d. The outputs C, D from device 28 (FIGURES 4e, 4f) are also complementary to each other and have a period equal to 4 times the period of clock 21. The complementary outputs E, F from device 29 (FIGURES 4g, 4h) have a period equal to eight times the period of clock 21.

The six output pulses from the devices 27, 28 and 29 are supplied to the correspondingly labelled input terminals of a coding matrix device 32 which is also connected to the function switches 11—18 and which serves to produce an output signal indicating the condition of the function switches. Matrix 32 may be of any suitable type capable of performing this operation, but I have found that a matrix constructed and operating on the following principles is especially satisfactory. The matrix comprises a plurality of diodes and resistors arranged in matrix form in rows and columns, with the connections thereto from switches 11—18 and from devices 27, 28 and 29 as indicated in FIGURE 2. The matrix operates so that when all the function switches are open or normal, no operative output is produced from the matrix, but when one or more of the function switches are closed or abnormal, the matrix produces an output whose position in time relative to the clock cycle indicates which of the function switches is abnormal. This action may be accomplished by utilizing the binary code set forth in the following table:

*Table 1*

| Switch | Binary Input | | | | | |
|---|---|---|---|---|---|---|
| | A | B | C | D | E | F |
| 1 | 1 | 0 | 1 | 0 | 1 | 0 |
| 2 | 0 | 1 | 1 | 0 | 1 | 0 |
| 3 | 1 | 0 | 0 | 1 | 1 | 0 |
| 4 | 0 | 1 | 0 | 1 | 1 | 0 |
| 5 | 1 | 0 | 1 | 0 | 0 | 1 |
| 6 | 0 | 1 | 1 | 0 | 0 | 1 |
| 7 | 1 | 0 | 0 | 1 | 0 | 1 |
| 8 | 0 | 1 | 0 | 1 | 0 | 1 |

In the above table, a binary "1" indicates a negative value, while a binary "0" indicates a less negative or positive value. A study of this table will show that for each of the eight function switches there is a unique combination of three of the binary inputs A through F which are negative. For example, for switch #1, binary inputs A, C and E are negative; for switch #5, binary inputs A, C and F are negative; for switch #8, binary inputs B, D and E are negative. The above relationships between the polarities of the different binary inputs and the different clock periods can be seen in the timing diagrams of FIGURE 4 which show the unique combinations described in the table.

When there is both a negative signal applied through any one of the function switches and the unique combination of negative inputs on the binary inputs associated with that switch or switches, matrix 32 is operative to produce a negative output signal on its common output conductor 37. One method of producing the above described unique combinations of inputs is to utilize diodes which are selectively connected to the different function switches and to the different binary inputs. For example, in the row of the matrix corresponding to function switch #1, diodes can be provided in the columns corresponding to binary inputs A, C and E and these diodes can be so connected that they require the presence of negative voltages thereon to become conductive. Thus, when binary input terminals A, C and E are negative, as they are only during the first period of the clock cycle, these diodes in the row representing switch #1 all have negative voltages thereacross and are conductive. If, at the same time, the function switch #1 is closed, the negative potential from terminal 10 is also applied through the closed switch to this row of the matrix to produce a negative output signal on conductor 37. It will be understood that other diodes will be similarly disposed and connected in the other columns of the rows of the other function switches in accordance with the code of Table 1, and that a negative output will be produced from the matrix on conductor 37 when any function switch is closed and the binary inputs for that particular switch are all negative.

The output conductor 37 of matrix 32 is connected to the control input of a gate 41. Gate 41 receives a controlled input from the second output terminal 23 of clock 21. The output from gate 41 is connected to a first delay network 42 whose output in turn is connected to multivibrator 25. When gate 41 receives a positive input signal over conductor 37, the gate will not open to permit passage of the clock pulse from terminal 23 so that delay 42 is not actuated. However, when a negative pulse appears on conductor 37, gate 41 is opened to pass the clock pulse from terminal 23 to delay 42 to operate this delay. Delay 42 has a delay period of one third the time of one of the periods of the clock cycle, so that when this delay is operated it causes the output multivibrator 25 to reverse its state in just one half the time usually required when this multivibrator is reversed by the clock pulses from clock 21. This reversal of multivibrator 25 by delay 42 produces the distinctive modulation of the pulse train which is indicative of the abnormality of one of the function switches, as will be described in detail below.

There is also provided a second gate network 44 which receives a control input from what is, in effect, a three way negative AND gate in the form of diodes 47B, 47D and 47F. A fourth unlabelled diode is shown adjacent diodes 47B, 47D and 47F to indicate the manner of connecting additional binary inputs where more than eight functions are provided. Diode 47B is connected to terminal B of binary device 27; diode 47D is connected to terminal D of device 28; and diode 47F is connected to terminal F of device 29. When terminals B, D and F are all negative, as they are only during the eighth period of the clock cycle, a negative pulse is passed through diodes 47 to open gate 44 and permit the positive going portion of the controlled pulse from terminal 22 of clock 21 to pass therethrough to a second delay 46.

The output from delay 46 is supplied to a clamping network 48 which is, in turn, connected to an input of clock 21. Actuation of clamp 48 by delay 46 clamps clock 21 to cause the positive output thereof to remain positive for a period which is slightly longer than two-thirds of one of the clock periods. This action causes a slightly longer period to exist between the start of the eighth pulse and the start of the following first pulse than exists between any other adjacent pairs of pulses, and it is this slightly longer interval which is utilized to indicate the end of the pulse train for one cycle for synchronizing the coding end with the decoding end.

The operation of the coding portion of the system can best be understood by reference to the timing diagrams of FIGURE 4 and a description of the operation. First, assume that all the function switches are normal or open. Clock 21 is operating and drives output multivibrator 25 to produce an output pulse train which is shown in FIGURE 4j. In this pulse train, each pulse is negative for approximately two-thirds of a period, T, and then goes positve for the remaining one-third of the period. With all of the function switches open, none of the rows of coding matrix 32 receive a negative input from conductor 10 through the function switches, so that matrix 32 does not produce a negative output on conductor 37. Under these conditions, the first delay 42 is not actuated and does not affect the operation of output multivibrator 25. The output pulse train from multivibrator 25 thus consists of identical long pulses for each function position.

At approximately two-thirds of the way through the eighth pulse period, when the output pulse on terminal 22 goes positive, gate 44 is actuated to pass this positive pulse to delay 46 and thus operate clamp 48, as described above. Gate 44 is opened by the existence of three negative pulses on binary output terminals B, D and F during the eighth period, as discussed above. When clamp 48 is operated, it clamps the positive output of clock 21 so as to keep this output positive for a period which is approximately two-thirds of one of the clock periods. This distinctively long positive pulse at the end of the pulse train serves to identify the end of the train for purposes of synchronization.

Next, assume that function switch #3 is closed, indicating an abnormality of the function represented by that switch. Clock 21 initiates its pulses as before to drive the output multivibrator 25. However, when the third pulse in the clock train is generated, a negative polarity will exist on output terminals A, D and E of binary devices 27, 28 and 29, as indicated by Table 1 and by the graphs of FIGURE 4. With switch #3 closed, a negative potential is applied from conductor 10 to the matrix row corresponding to this switch. Since the diodes in the A, D and E columns of this row of the matrix are at this time receiving negative pulses from their associated binary terminals A, D and E, this row of the matrix becomes conductive to produce a negative output pulse on conductor 37. This negative pulse is supplied to gate 41, and since gate 41 is at this time receiving a positive controlled pulse from terminal 23 (the third clock pulse of the train), the gate is opened to operate delay 42. Delay 42, whose output is connected to multivibrator 25, has a period equal to approximately one-third of a clock period and thus causes multivibrator 25 to reverse its state of conductivity in one-half the time that would have been required if it were reversed by the next pulse in the clock train. This produces a pulse during the third clock period which is shorter than the other pulses, as indicated clearly in FIGURE 4k, and it is this distinctively modulated pulse which is sensed in the decoding system to provide an indication of the existence and location of the abnormal condition.

After transmission over the particular communication link 7 is selected, the pulse train from the coder is received at the decoder shown in FIGURE 3. The pulse train is first supplied to a pulse shaper network 51 which sharpens the edges of the pulses and equalizes their amplitudes to compensate for any distortion the pulse train may have undergone in transmission. Pulse shaper 51 is preferably a bistable multivibrator which produces a positive going output signal at a terminal 52, as shown in the graph of FIGURE 4m, and produces a negative going output signal at a terminal 53, as shown in FIGURE 4n. The positive going signal at terminal 52 drives three binary devices 47, 48 and 49 which are substantially identical to devices 27, 28 and 29 of the coder and which operate to produce signals having the waveforms shown in FIGURES 4c through 4h. The output terminals of these devices are labelled A, B, C, D, E and F, in a manner similar to that used in connection with the coder. Devices 47, 48 and 49 are supplied with a reset pulse through a conductor 60 from a reset gate 61 at the end of the eighth pulse in the pulse train, as will be described below.

The positive going output pulse from shaper 51 also drives a first delay network 62 which has a delay equal to one-half of a period in the clock cycle. The waveform of the output of this delay is illustrated in FIGURE 4p, and it begins with a negative portion for one-half a period and then swings positive for the other half of the period. The output signal from delay 62 drives a second delay network 63 which is triggered by the positive going end of the negative pulse from delay 62. When triggered, delay 63 produces a negative going pulse, as shown in FIGURE 4q, which has a duration equal to two-thirds of one of the periods of the clock cycle. This pulse from delay 63 is supplied to reset gate 61 to initiate a Reset operation if the Reset gate is open when the negative pulse from delay 63 arrives. It will be noted from FIGURES 4p, 4q that delay 63 is triggered by delay 62 and that the pulse from delay 63 extends through the first one-third of the following clock period, for a purpose which will be explained below.

The output pulse from the first delay 62 is also supplied in parallel to an ON multivibrator gate 66 and an OFF multivibrator gate 67. These gates are connected, respectively, to an ON multivibrator 68 and an OFF multivibrator 69. The pulse from delay 62 will trigger either gate 66 or gate 67 (and their associated multivibrators), depending upon which of these gates is open at the conclusion of the negative going portion of the pulse from delay 62. The opening of gates 66 and 67 is controlled by the pulses received from pulse shaper 51, gate 66 being connected to the positive output terminal 52, while gate 67 is connected to the negative terminal 53.

The output signals from the binary devices 47, 48 and 49 are supplied as separate inputs to a decoding matrix 49 which is somewhat similar to coding matrix 32. Matrix 70 has eight output terminals, 71, 72, 73, 74, 75, 76, 77, 78, which are connected to the eight indicating or control means of the decoder to provide an indication or a control operation in response to detection of a closed switch in the coder section. Decoder matrix 70 receives the six signals A, B, C, D, E and F from binary devices 47, 48 and 49 and is so constructed as to produce an output signal from one of its eight output terminals only when the unique combination of negative inputs appears in the columns of that row of the matrix. Matrix 70 operates on the same binary code as coder 32, as set forth in Table 1 and is operative to produce an output pulse in a given row corresponding to a given indicating circuit only when the input signals to the diodes in the three columns of that row are negative in accordance with the code of Table 1. Thus, an output signal appears on output conductor 71 during the first period of the clock cycle when binary inputs A, C and E are negative; an output appears on output terminal 73 during the third period of the clock cycle when the binary inputs A, D and E are negative, etc. Hence, an output signal is produced from decoding matrix 70 for each period of the clock cycle, and this output is supplied to the indicating or control circuit corresponding to that clock period or function.

The indicating or control circuits in the decoder may be of any suitable type, but preferably they are of the type illustrated in FIGURE 3. A separate circuit, 81, 82, 83, 84, 85, 86, 87, 88, is provided for each function, and each such circuit may include, as shown for example for function #1, an ON gate 81a, an OFF gate 81b and a driver network 81c. The outputs of gates 81a, 81b are supplied as inputs to driver 81c to turn this network ON or OFF, in dependence upon which of the gates is operated. Driver 81c may be a bistable multivibrator whose output is utilized to operate the lamps or relays or other devices which provide the indication or control for the functions.

The ON and OFF gates for each function circuit receive one common input from the decoding matrix output terminal which is associated with the function. Thus, gates 81a, 81b receive a common input from matrix output terminal 71; gates 83a, 83b receive a common input from matrix output terminal 73, etc. Each of the ON gates 81a through 88a receives a common input through a conductor 90 from the output of the ON multivibrator 68, while each of the OFF gates 81b through 88b receives a common input through a conductor 91 from the output of the OFF multivibrator 69.

The operation of the decoder can best be explained by first assuming that all of the function switches at the coder are open. Under these conditions, the pulse train received at pulse shaper 51 is uniform and shaper 51 produces two output pulse trains at terminals 52, 53 as shown in FIGURES 4m and 4n. The positive going output pulse train from terminal 52 drives binary devices 47, 48 and 49 to produce output pulse trains A, B, C, D, E and F from these devices as shown in FIGURES 4c through 4h. These binary output pulses are supplied to the corresponding inputs of decoding matrix 70 where they are operative to produce an output signal on each of the matrix output terminals 71 through 78 during the period of the clock cycle corresponding to the associated function, in accordance with the binary code shown in Table 1.

The positive going output signal from terminal 52 of shaper 51 also triggers the first delay 62, closes the RESET gate 61, closes the ON multivibrator gate 66, and provides a pulse to reset the ON and OFF multivibrators 68, 69 at the start of the pulse. Simultaneously with the above action, the negative going signal from terminal 53 of shaper 51 opens the OFF multivibrator gate 67. When the first delay 62 recovers (or goes from negative to positive), which recovery will occur in approximately the middle of the first period, this positive signal passes through OFF multivibrator gate 67 to trigger OFF multivibrator 69. Triggering of multivibrator 69 sends a pulse over conductor 91 and through OFF gate 81b to flip the function #1 driver 81c to OFF to thus deenergize the lamp or relay connected to the output of this driver. It will be recalled that during the first clock period, matrix 70 produces an output signal on terminal 71, and only on terminal 71, to open gates 81a, 81b. It will be noted that the output from multivibrator 69 on conductor 91 is also supplied to the seven other OFF gates associated with the drivers 82c through 88c, but since none of these seven other OFF gates receive input pulses from their associated output terminals of decoding matrix 70 during the first clock period, these gates are not opened.

During the above action, the ON multivibrator 68 is not triggered, since its associated gate 66 was held closed by the long positive pulse from terminal 52 of shaper 51 until after delay 62 has recovered.

With all functions normal, the operation continues as above through each of the eight periods of the clock cycle to put each of the eight drivers in the OFF condition and prevent energization of any of the associated lamps or relays. As discussed above, after the eighth pulse has come through, there is a time longer than two-thirds of a clock period when no pulse is being received. When this occurs, the RESET gate 61 is held open by the lack of a positive going pulse from output terminal 52 of shaper 51 for a time sufficient for the positive going pulse from the second delay 63 to pass through gate 61 and reset the binary devices 47, 48 and 49. This resetting automatically synchronizes the coder with the decoder after any interruption in the communication link between the two elements. In this connection, it will be noted that the "zero" time is accurately derived on the basis of the timing of the code pulse train, since delay 62 is triggered by the incoming pulse train and delay 63 is triggered by the first delay 62. Thus, the pulse from delay 63 extends into the following clock period in order to derive the "zero" time, but this pulse is based on the timing of the pulse train itself since it is based on the triggering of delay 62 by the pulse train.

Next, assume that the function switch #3 in the coder is closed. Under these conditions, there is a short pulse during the third clock period, rather than a long pulse which occurs during this period when the switch is open. This short pulse is shaped in shaper 51 and supplied to its output terminals 52 and 53. The positive going pulse on terminal 52, as shown by the dotted line portion of FIGURE 4m is now shorter than the negative going pulse from delay 62 during the third period, so that the end of the negative going pulse from delay 62 now passes through ON multivibrator gate 66 to trigger ON multivibrator 68. At the same time, the OFF multivibrator gate 67 is closed, owing to the short negative pulse out of pulse shaper 51, so that the OFF multivibrator 69 is not triggered.

Triggering of ON multivibrator 68 sends a pulse over conductor 90 to the inputs of the eight ON gates 81a through 88a. However, since only gate 83c is receiving an input from its associated output terminal 73 of matrix 70 during this third period, the pulse on conductor 90 passes only through gate 83a to driver 83c. This turns this driver ON to supply energization to its associated lamp or relay to indicate that function switch #3 is closed. It will be seen that driver 83c will remain ON until a long pulse comes through during the third clock period, so that the system will continue to indicate that this function switch is closed until it is actually opened.

In the above described embodiment, it was assumed that the functions being monitored were represented by the opening and closing of a switch, but it will be apparent to those skilled in the art that any other binary representation of a function may be utilized in the present invention with equal facility. Similarly, it was assumed that lamps or relays were energized at the decoder end of the system in response to the detection of an abnormal condition of one of the functions, but it will be clear that any other suitable type of device may be utilized in this connection, or that some control operation may be initiated in response to this detection to return the condition of the function to normal. Also, although the invention was described in connection with eight functions, it will be apparent that it is equally applicable to an increased number of functions by an increase in the number of binary stages and an expansion of the matrices to suit the desired number of functions.

Although but a few embodiments have been illustrated or described, it will be apparent that various changes and modifications may be made therein without departing from the spirit of the invention or the scope of the appended claims.

What is claimed is:

1. Apparatus for monitoring a plurality of functions which have two conditions comprising:
   (a) a source of periodic pulses providing a timing cycle consisting of one pulse associated with each of said functions and one synchronizing pulse;
   (b) means for modulating each of said pulses in accordance with the condition of the associated functions; and
   (c) means for decoding said timing cycle to detect the condition of each function, said decoding means utilizing said synchronizing pulse for timing to detect the position of and thereby the function associated with each modulated pulse, and utilizing the modulation of each pulse to detect the condition of the associated function.

2. Apparatus in accordance with claim 1 in which said modulating means modulates the pulse width of said pulses in accordance with the condition of the associated function.

3. Apparatus for monitoring a plurality of functions which have two conditions comprising:
   (a) a source of periodic pulses providing a timing cycle consisting of one encoding pulse associated with each of said functions and one synchronizing pulse;
   (b) means for modulating each of said encoding pulses in accordance with the condition of the associated functions, said modulating means including matrix means for sequentially interrogating each function to determine its condition; and (c) means for decoding said modulated pulses to detect the condition of each function, said decoding means utilizing said synchronizing pulse for timing to detect the position of and thereby the function associated with each modulated pulse, and utilizing the modulation of each modulated pulses to detect the condition of the associated function.

4. Apparatus in accordance with claim 3 in which said encoding pulses are pulse width modulated in accordance with the condition of the associated function.

5. Apparatus for monitoring a plurality of functions which have two conditions comprising:
   (a) a source of periodic pulses providing a timing cycle consisting of one encoding pulse associated with each of said functions and one synchronizing pulse of greater width than an encoding pulse;
   (b) means for modulating each of said encoding pulses in accordance with the condition of the associated functions; and
   (c) means for decoding said modulated pulses to detect the condition of each function, said decoding means utilizing said synchronizing pulse for timing to detect the position of and thereby the function associated with each modulated pulse, and utilizing the modulation of each pulse to detect the condition of the associated function, said means for decoding including a first delay and a second delay, said first delay being triggered once each pulse period, means responsive to said first delay for triggering said second delay at a predetermined time after the beginning of each pulse period, said second delay remaining triggered for a portion of time which extends into the pulse period following the pulse period in which said second delay was triggered, and means responsive to said second delay remaining energized into said synchronization pulse period for indicating the occurrence of said synchronization pulse.

6. Apparatus in accordance with claim 5 in which said last mentioned means is a gating circuit for gating the output signal from said second delay and which is gated by gating signals derived from said pulses and in which the time of occurrence of the output signal from said second delay is set to coincide only with the gating signal derived from said synchronizing pulse.

7. A digital telemetering system for sequentially and cyclically monitoring a plurality of functions each having a first and a second condition, said system comprising:
   (a) clock means for generating clock pulses unsymmetrical within a clock pulse period, said clock means including control means responsive to a cycle signal for interrupting said clock pulses for a selected time interval to provide successive trains of pulses having a predetermined cycle;
   (b) output means responsive to said clock pulses and to a coding signal and operative to provide a train of coded pulses, each coded pulses having one characteristic for one condition of said coding signal and a different characteristic for another condition of said coding signal;
   (c) binary counter means responsive to said clock pulses and operative to provide said cycle signal after reception of a predetermined number of clock pulses; and
   (d) a binary coding matrix responsive to said binary counter means and operative to sequentially interrogate each one of the plurality of functions to be monitored to sequentially derive coding signals which corresponds to the condition of the function monitored, said coding signals having a first and a second condition depending on the condition of the function monitored.

8. A digital telemetering system for sequentially and cyclically monitoring a plurality of functions each having a first and a second condition, said system comprising:
   (a) clock means for generating clock pulses of a selected characteristic within a clock pulse period, said clock means including control means responsive to a cycle signal for interrupting said clock pulses for a selected time interval to provide successive trains of pulses having a predetermined cycle;
   (b) output means responsive to said clock pulses and to a coding signal and operative to provide a train of coded pulses, each coded pulse having said selected characteristic for one condition of said coding signal and of a selected characteristic for another condition of said coding signal;
   (c) binary counter means responsive to said clock pulses and operative to provide said cycle signal after reception of a predetermined number of clock pulses;
   (d) a binary coding matrix responsive to said binary counter means and operative to sequentially interrogate each one of the plurality of functions to be monitored to sequentially derive coding signals which correspond to the condition of the function monitored, said coding signals having a first and a second condition depending on the condition of the function monitored; and
   (e) decoding means for detecting the position and characteristic of each coded pulse, said decoding means utilizing said selected time interval between successive trains of coded pulses to detect the position of each coded pulse and the characteristic of each coded pulse to detect the condition of the associated function.

9. A digital telemetering system for sequentially and cyclically monitoring a plurality of functions each having a first and a second condition, said system comprising:
   (a) clock means for generating clock pulses of a selected characteristic within a clock pulse period;
   (b) control means associated with said clock means and responsive to a cycle signal and operative to provide a delay of said clock pulses for a selected time interval to form successive trains of pulses having a predetermined cycle;
   (c) output means responsive to said clock pulses and to a coding signal and operative to provide trains of coded pulses, each coded pulse having one characteristic for one condition of said coding signal and a different characteristic condition for another condition of said coding signal;
   (d) binary counter means responsive to said clock pulses and operative to provide said cycle signal after reception of a predetermined number of clock pulses;
   (e) a binary coding matrix responsive to said binary counter means and operative to sequentially interrogate each one of the plurality of functions to be monitored to sequentially derive coding signals which corresponds to the condition of the function monitored, said coding signals having a first and a second condition depending on the condition of the function monitored;
   (f) decoding means for detecting the position and characteristic of each coded pulse, said decoding means utilizing said selected time interval between successive trains of coded pulses to detect the position of each coded pulse and the characteristic of each coded pulse to detect the condition of the associated function; and
   (g) a communication link for transmitting said successive coded pulse trains from said output means to said decoding means.

10. A digital telemetering system for sequentially and cyclically monitoring a plurality of condition responsive functions each of which has a first and a second condition, said system comprising:
   (a) a coding means for deriving successive trains of coded pulses, each train having a predetermined cycle and each pulse within each train having a predetermined period within said cycle, each period being associated with a different one of said functions, said coded pulses having one characteristic when the function associated with that period has said first condition and a different characteristic when the associated function has said second condition;

(b) a communication link for transmitting said train of coded pulses;

(c) receiving means responsive to said successive trains of coded pulses and operative to provide output pulses corresponding to the characteristic of said coded pulses and reset pulses, corresponding to end of a train of coded pulses;

(d) binary counter means responsive to said output pulses and said reset pulses, said counter means being sequentially advanced by said output pulses and being reset by said reset pulses;

(e) a binary decoding matrix associated with and advanced by said binary counter means to provide output signals associated with the functions;

(f) pulse width analyzer means responsive to said output pulses and operative to provide a first control signal for one characteristic of said output pulses and a second control signal for the other unsymmetrical condition; and (g) a condition indicating means associated with each function and responsive to the output signal associated with the function, said indicating means also being responsive to said first and second control signal and being switched to one of its two conditions by the associated output signal in accordance with said first and second control signal.

11. A digital telemetering system for sequentially and cyclically monitoring a plurality of condition responsive functions each of which has a first and a second condition, said system comprising:

(a) a coding means for deriving successive trains of coded pulses, each train having a predetermined cycle and each pulse within each train having a predetermined period within said cycle, each period being assigned to a different one of said functions, said coded pulses having one characteristic when the function associated with that period has said first condition and a different characteristic when the associated function has said second condition;

(b) a communication link for transmitting said train of coded pulses;

(c) receiving means responsive to said successive trains of coded pulses and operative to provide output pulses corresponding to the different characteristic of said coded pulses and reset pulses corresponding to end of a train of coded pulses;

(d) binary counter means responsive to said output pulses and said reset pulses, said counter means being sequentially advanced by said output pulses and being reset by said reset pulses;

(e) a binary decoding matrix having a separate output signal lead associated with each of said functions, said matrix being advanced by said binary counter means to provide an output signal on the output signal lead associated with the function upon reception of a pulse which corresponds in position to the pulse period associated with the function;

(f) pulse width analyzer means responsive to said output pulses and operative to provide a first control signal for one characteristic and a second control signal for the other characteristic of said coded pulses; and (g) a plurality of conditions indicating means each connected to a different output signal lead, each condition indicating means being responsive to its assocoated output signal and said first and second control signal and being switched to one of its two conditions by the output signal in accordance with said first and second control signal.

12. A digital telemetering system for sequentially and cyclically monitoring a plurality of functions each having a first and a second condition, said system comprising:

(a) clock means for generating periodic clock pulses of a selected characteristic, said clock means including control means responsive to a cycle signal for interrupting said clock pulses for a selected time interval to provide successive trains of clock pulses having a predetermined cycle;

(b) output means responsive to said clock pulses and to a coding signal and operative to provide a train of coded pulses, each coded pulse having one characteristic for one condition of said coding signal and a different characteristic for the other condition of said coding signal;

(c) binary counter means responsive to said clock pulses and operative to provide said cycle signal after reception of a predetermined number of clock pulses;

(d) a binary coding matrix responsive to said binary counter means and operative to sequentially interrogate each one of the plurality of functions to be monitored to sequentially derive coding signals which correspond to the condition of the function monitored, said coding signals having a first and a second condition depending on the condition of the function monitored;

(e) a communication link for transmitting said train of coded pulses;

(f) receiving means responsive to said successive trains of coded pulses and operative to provide output pulses corresponding to the characteristics of said coded pulses and reset pulses corresponding to end of a train of coded pulses;

(g) binary counter means responsive to said output pulses and said reset pulses, said counter means being sequentially advanced by said output pulses and being reset by said reset pulses;

(h) a binary decoding matrix associated with and advanced by said binary counter means to provide output signals each assigned to a different function;

(i) pulse width analyzer means responsive to said output pulses and operative to provide a first control signal for one characteristic and a second control signal for the other characteristic of said coded pulses; and (j) condition indicating means assigned to each function, each condition indicating means being responsive to the output signal assigned to the corresponding function and said first and second control signals, and being switched to one of its two conditions by the output signal in accordance with said first and second control signal.

References Cited in the file of this patent

UNITED STATES PATENTS

| | | |
|---|---|---|
| 2,570,716 | Rochester | Oct. 9, 1951 |
| 2,760,002 | Van Weel | Aug. 21, 1956 |
| 2,812,509 | Phelps | Nov. 5, 1957 |
| 2,887,674 | Greene | May 19, 1959 |

UNITED STATES PATENT OFFICE
CERTIFICATE OF CORRECTION

Patent No. 3,088,098 April 30, 1963

Laurence Moore

It is hereby certified that error appears in the above numbered patent requiring correction and that the said Letters Patent should read as corrected below.

Column 10, line 10, for "and of a selected characteristic for another condition" read -- and a different characteristic for another condition --.

Signed and sealed this 24th day of December 1963.

(SEAL)
Attest:

ERNEST W. SWIDER

Attesting Officer

EDWIN L. REYNOLDS

Acting Commissioner of Patents